United States Patent [19]
Bakula et al.

[11] Patent Number: 5,921,399
[45] Date of Patent: Jul. 13, 1999

[54] GUMBO SEPARATOR

[75] Inventors: John J. Bakula, Grand Island; Scott M. Kroon, Cheektowaga, both of N.Y.

[73] Assignee: Derrick Corporation, Buffalo, N.Y.

[21] Appl. No.: 08/661,395

[22] Filed: Jun. 7, 1996

[51] Int. Cl.$^6$ ....................................... B07B 1/10
[52] U.S. Cl. ................... 209/272; 209/307; 209/380; 209/390; 210/396; 210/400; 210/783
[58] Field of Search ................... 209/268, 269, 209/272, 307, 379, 380, 385, 386, 389, 390; 210/396, 400, 401, 783

[56] References Cited

U.S. PATENT DOCUMENTS

| Re. 34,458 | 11/1993 | Fahrenholz | 241/74 |
|---|---|---|---|
| 40,242 | 10/1863 | Capell . | |
| 246,144 | 8/1881 | Keeler . | |
| 275,340 | 4/1883 | Kimball . | |

(List continued on next page.)

FOREIGN PATENT DOCUMENTS

| 505776 | 9/1951 | Belgium . | |
|---|---|---|---|
| 0453348 | 10/1991 | European Pat. Off. | D21D 5/16 |
| 2285935 | 5/1976 | France | 209/272 |
| 3818972 | 2/1990 | Germany | B01D 29/07 |
| 1203010 | 8/1989 | Japan | B01D 27/06 |
| 457924 | 12/1936 | United Kingdom . | |
| 519680 | 4/1940 | United Kingdom . | |
| 743902 | 1/1956 | United Kingdom . | |
| 823648 | 11/1959 | United Kingdom . | |
| 1106513 | 3/1968 | United Kingdom | B07B 1/36 |
| 1225849 | 3/1971 | United Kingdom | C13C 1/00 |
| 1512958 | 6/1978 | United Kingdom | B01D 27/06 |
| 2124099 | 2/1984 | United Kingdom | B01D 23/02 |
| 2248198 | 4/1992 | United Kingdom | B04C 5/081 |
| WO 8910781 | 11/1989 | WIPO | B01D 27/06 |
| 9303863 | 3/1993 | WIPO | 209/272 |

OTHER PUBLICATIONS 2 page drawing labeled A and B; Received by John J. Bakula from Doug Fruge dated Jan. 16, 1997.
Nu–Tec, Inc., Gumbo Express Chain, Nov. 10, 1994, Lake Charles, Louisiana.
Derrick Corporation, Wet Sizing & Dewatering Screens, Jun. 1994, pp. 1–16, USA.
Derrick Corporation, Derrick Pyramid Screens, undated, pp. 1–4.
Derrick Corporation, Derrick DE–1000 FHD Centrifuge, undated, pp. 1–6.
Derrick Corporation Brochure, Screen Surfaces & Accessories, undated, pp. 1–14 and Fine Square Mesh Screen Cloth DWG.1723 1 page.
Derrick Corporation, Hi "G" Dryer with Desander & Desilter, Apr. 1994, pp. 1–2, USA.
Derrick Corporation, Model 58 Flo–Line Cleaner Plus, undated, pp. 1–2.
Derrick Corporation, Vacu–Flo Degasser, undated, pp. 1–4.
Derrick Corporation, Flo–Line Cleaner Plus, undated, pp. 1–4.

*Primary Examiner*—Tuan N. Nguyen
*Attorney, Agent, or Firm*—Conley, Rose & Tayon

[57] ABSTRACT

A gumbo separator has a continuous, inclined, moving screen belt which rides on and is supported by a perforated backing plate. The desirable portion of drilling fluids fed to the gumbo separator passes through the screen belt and backing plate and may be further processed to remove drill cuttings. The gumbo, containing gummy hydrated clays, are conveyed off the screen belt to the reserve pit. The gumbo separator provides a self cleaning screen belt, using a counter-rotating belt cleaning brush. A spray bar backwashes the screen belt with high pressure drilling mud to remove any gumbo lodged in the screen belt openings.

30 Claims, 11 Drawing Sheets

U.S. PATENT DOCUMENTS

| | | | |
|---|---|---|---|
| 500,302 | 6/1893 | Stoeckel et al. . | |
| 526,562 | 9/1894 | Cross . | |
| 560,858 | 5/1896 | Missroon . | |
| 607,598 | 7/1898 | Closz . | |
| 691,045 | 1/1902 | Climenson et al. . | |
| 800,693 | 10/1905 | Traylor . | |
| 864,828 | 9/1907 | Callow . | |
| 964,144 | 7/1910 | Chavanne et al. . | |
| 964,897 | 7/1910 | Bryant . | |
| 966,578 | 8/1910 | Murphy et al. . | |
| 984,866 | 2/1911 | Tate . | |
| 1,013,040 | 12/1911 | Morse . | |
| 1,019,041 | 3/1912 | Green . | |
| 1,098,979 | 6/1914 | Schuchard . | |
| 1,132,667 | 3/1915 | Milliot . | |
| 1,423,021 | 7/1922 | Reynolds . | |
| 1,462,804 | 7/1923 | Evans . | |
| 1,561,632 | 11/1925 | Woodward . | |
| 1,947,307 | 2/1934 | Rafton | 209/401 |
| 1,997,713 | 4/1935 | Boehm | 209/393 |
| 1,997,740 | 4/1935 | Nickerson | 209/403 |
| 2,082,513 | 6/1937 | Roberts | 210/76 |
| 2,089,548 | 8/1937 | Frantz et al. | 210/149 |
| 2,274,700 | 3/1942 | Heller | 209/400 |
| 2,315,055 | 3/1943 | Heller | 209/400 |
| 2,406,051 | 8/1946 | Weiss | 154/30 |
| 2,462,878 | 3/1949 | Logue | 210/149 |
| 2,649,441 | 8/1953 | Soldan | 210/155 |
| 2,723,032 | 11/1955 | Gisler et al. | 209/401 |
| 2,726,184 | 12/1955 | Cox et al. | 154/83 |
| 2,917,245 | 12/1959 | Polleys | 241/15 |
| 2,929,464 | 3/1960 | Sprouse | 183/69 |
| 2,957,235 | 10/1960 | Steinberg | 29/424 |
| 2,980,208 | 4/1961 | Neumann | 183/71 |
| 3,057,481 | 10/1962 | Pall | 210/493 |
| 3,165,473 | 1/1965 | Pall et al. | 210/510 |
| 3,255,885 | 6/1966 | Burls | 209/314 |
| 3,306,794 | 2/1967 | Humbert, Jr. | 156/69 |
| 3,374,886 | 3/1968 | Lightsey | 209/28 |
| 3,465,413 | 9/1969 | Rosaen et al. | 29/428 |
| 3,664,503 | 5/1972 | Felden | 209/397 |
| 3,747,772 | 7/1973 | Brown | 210/493 |
| 3,853,529 | 12/1974 | Boothe et al. | 55/499 |
| 3,880,762 | 4/1975 | Wise | 210/460 |
| 3,963,605 | 6/1976 | Seabourn | 209/2 |
| 4,019,987 | 4/1977 | Krasnow | 210/232 |
| 4,022,596 | 5/1977 | Pedersen | 55/528 |
| 4,033,865 | 7/1977 | Derrick | 209/319 |
| 4,042,507 | 8/1977 | Langmack | 210/158 |
| 4,064,051 | 12/1977 | Wehner | 210/389 |
| 4,065,382 | 12/1977 | Derrick | 209/313 |
| 4,075,106 | 2/1978 | Yamazaki | 210/487 |
| 4,079,010 | 3/1978 | Killeen et al. | 210/400 |
| 4,085,776 | 4/1978 | Derrick | 137/561 |
| 4,380,494 | 4/1983 | Wilson | 209/319 |
| 4,512,892 | 4/1985 | Ganzi et al. | 210/493 |
| 4,517,090 | 5/1985 | Kersten et al. | 210/493 |
| 4,575,421 | 3/1986 | Derrick et al. | 209/397 |
| 4,594,162 | 6/1986 | Berger | 210/493 |
| 4,617,122 | 10/1986 | Kruse et al. | 210/493 |
| 4,647,373 | 3/1987 | Tokar et al. | 210/232 |
| 4,692,240 | 9/1987 | Arbuthnot et al. | 209/254 |
| 4,696,751 | 9/1987 | Eifling et al. | 210/780 |
| 4,701,197 | 10/1987 | Thornton et al. | 55/487 |
| 4,746,339 | 5/1988 | Millard | 55/302 |
| 4,758,333 | 7/1988 | Masica et al. | 209/397 |
| 4,819,809 | 4/1989 | Derrick | 209/275 |
| 4,820,407 | 4/1989 | Lilie | 209/397 |
| 4,830,750 | 5/1989 | Jandourek et al. | 210/393 |
| 4,832,834 | 5/1989 | Baird, Jr. | 209/397 |
| 4,857,176 | 8/1989 | Derrick et al. | 209/392 |
| 4,882,054 | 11/1989 | Derrick et al. | 210/389 |
| 4,940,500 | 7/1990 | Tadokoro et al. | 156/204 |
| 4,954,249 | 9/1990 | Gero et al. | 209/273 |
| 5,041,222 | 8/1991 | O'Dell | 210/386 |
| 5,084,178 | 1/1992 | Miller et al. | 210/493 |
| 5,139,154 | 8/1992 | Gero et al. | 209/273 |
| 5,167,740 | 12/1992 | Michaelis et al. | 156/73.1 |
| 5,211,291 | 5/1993 | Kelley et al. | 209/680 |
| 5,221,008 | 6/1993 | Derrick et al. | 209/269 |
| 5,230,455 | 7/1993 | Price | 226/88 |
| 5,312,508 | 5/1994 | Chisholm | 156/292 |
| 5,330,057 | 7/1994 | Schiller et al. | 209/392 |
| 5,332,101 | 7/1994 | Bakula | 209/403 |
| 5,417,793 | 5/1995 | Bakula | 156/308 |
| 5,417,858 | 5/1995 | Derrick et al. | 210/388 |
| 5,417,859 | 5/1995 | Bakula | 210/388 |

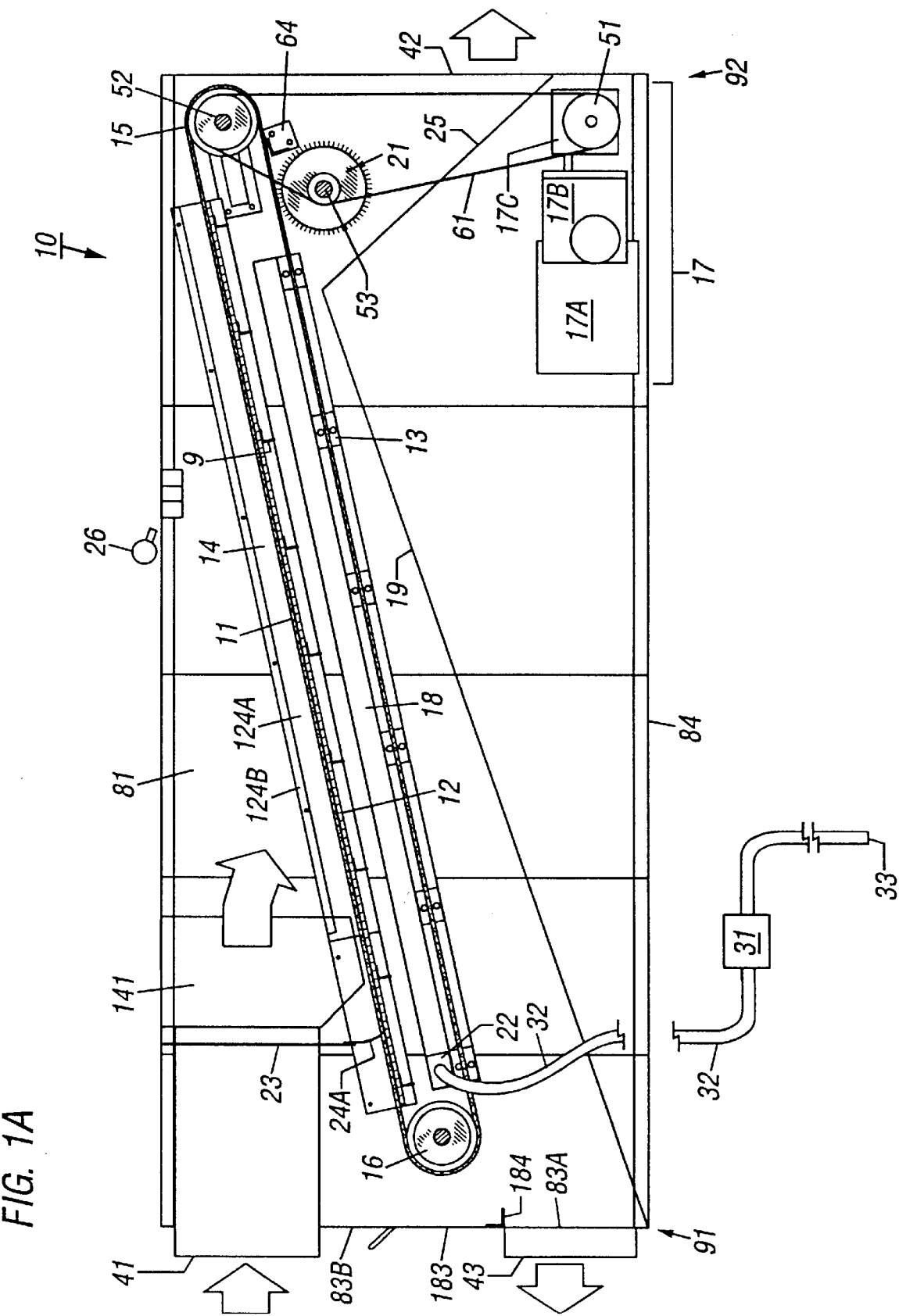

GUMBO SEPARATOR

FIELD OF THE INVENTION

This invention relates generally to apparatus and methods for separating solid particles from fluids or fluid slurries and more particularly to apparatus and methods for cleaning drilling mud by removing solids which behave as rheopectic fluids, such as hydrated clays, from the circulating drilling mud.

BACKGROUND OF THE INVENTION

The art of separating solid particles from fluid streams by passing a fluid through a screening device having perforations of such size that solid particles are retained on the screen surface instead of passing through is well known. In some processes however, it is not simply a matter of passing solid particles carried in a fluid stream across a screening device to obtain a separation. Some fluid streams contain additional materials that cause solid particles to adhere to each other or to the screen surface, ultimately bridging the screen openings and blinding the screen. Such a problem is frequently encountered in the drilling of wells during which operation a drilling mud is circulated into the bore hole.

During well drilling operations, drilling mud is continuously circulated between the bore hole and the surface. The mud removes drilling cuttings, also called drilled solids, from the face of the drill bit in the bore hole and carries them to the surface. Operations at the surface separate the cuttings from the mud. The mud is then recirculated to the drilling operation. The drilling mud must be maintained as clean and free of contamination by cuttings and foreign materials as possible. The drilling mud is typically cleaned by several types of equipment sequentially, including vibratory screening machines commonly referred to as shale shakers.

Frequently in drilling operations a gummy clay formation is encountered which makes the separation of drilling cuttings from the drilling mud by screening operations very difficult The gummy clay, sometimes called gumbo, adheres to the surfaces of screens and screening machines causing a buildup which can blind the screens so that the drilling mud, rather than passing through the screen where it can be recirculated, passes over and off the end of the screen where it is unrecoverable. These problems are at least partially due to the non-Newtonian rheological properties of the gumbo, which is largely comprised of hydrated clay particles. In particular, gumbo generally displays the properties of a rheopectic fluid. That is, it shows an increase in its viscosity with time under the influence of a suddenly applied constant shear stress.

Because the gumbo behaves as a rheopectic fluid, it tends to form into a cohesive mass on the screening equipment, sometimes referred to as a gumbo patty. Gumbo patties resist separation by vibratory screening equipment because they do not readily pass through the screen openings. Further, gumbo patties can not be conveyed off the screen to a waste stream because their viscosity increases as additional energy is applied by the screening machine in an attempt to transport them off the screen. This increase in viscosity results in the gumbo becoming more resistant to conveying as more energy is applied to transport it off the screen.

Thus gumbo tends to reduce the capacity of mud cleaning equipment to separate cuttings from drilling mud by clogging the screens and reducing their open area. As more gumbo is removed during well drilling, it tends to accumulate in the mud screening equipment. This obviously her reduces the ability of the screening equipment to clean the drilling mud. Eventually, this accumulation threatens the ability of the equipment to effectively clean the recirculating mud and may even force reduction of the drilling rate, with disastrous effects on drilling costs. In extreme cases, the well must be relocated, drilled in a different direction, or abandoned entirely.

The cost of drilling mud represents a substantial portion of the total cost to drill a well. Contamination of the mud can therefore easily increase drilling costs to a prohibitive level. Further, reducing the capacity of the mud cleaning equipment can limit the rate at which a well can be drilled. This increases the time required for drilling, again increasing drilling costs. Additionally, contamination of the drilling mud by gumbo or drilling cuttings increases the viscosity of the mud, which reduces the drilling rate and increases drilling costs.

Previous attempts to solve problems caused by gumbo have met with little success. Many of the prior efforts have focused on chemical additives in attempts to change the properties of the drilling mud, which add cost to an already substantial drilling expense. Mechanical approaches, such as increasing the vibrational amplitude and adding various types of water sprays have proven ineffective because the gumbo simply forms a new steady state gumbo patty at the new operating conditions. Other strategies have included applying specialized coatings to the screens, such as are described in U.S. Pat. No. 3,963,605. Such coatings add cost to the screening equipment, and are quickly worn off the screens by abrasive cuttings. Accordingly, there remains a need in the art for apparatus to remove gumbo from recirculating drilling mud. It would be preferable if such apparatus could be used in conjunction with, and upstream of, existing mud cleaning equipment and removed gumbo from the drilling mud before drilling cuttings were removed from the mud.

SUMMARY OF THE INVENTION

The present invention provides a gumbo separator comprising a vessel which is roughly rectangular in plan, having side plates, a back plate, and an open base upon which the vessel rests. The vessel has a fluid inlet through which a fluid solution passes, a fluid outlet through which cleaned fluid passes, and a solid discharge outlet through which separated solids pass to disposal. The invention provides a continuous, inclined, moving screen belt riding on and supported by a perforated backing plate to remove solids from the fluid solution and, in a preferred embodiment, to clean expensive drilling mud, which is one of the major costs associated with well drilling operations. The screen belt and perforated backing plate are constructed of materials which in combination have low sliding friction and excellent wear resistance. A variable speed drive assembly moves the belt at a rate sufficient to remove gummy materials such as hydrated clays, known as gumbo, from the drilling fluid before the gumbo can clog equipment used to remove drilling cuttings from the mud. The gumbo separator need only be activated when gumbo is encountered, which further reduces the costs of drilling.

Drilling fluids, comprising drilling mud, drilling cuttings, and gumbo, form a puddle on the screen belt, which assists in separating the drilling mud from the gumbo. The drilling mud, being comprised of liquid and very fine particles, passes through the screen belt, perforated backing plate, and fluid outlet, and is then available for further clearing. The gumbo, which behaves as a rheopectic fluid and is very difficult to convey by conventional equipment such as vibrating screens, is conveyed up the screen belt and discharged through the solids discharge outlet into a reserve pit for disposal. Minimal energy is added to the gumbo to separate and convey it, which minimizes its tendency to form the gumbo patties which have clogged previous apparatus designed to separate it from the drilling mud.

The invention provides a belt cleaning brush, which rotates against the direction in which the screen belt is moving, to brush any remaining gumbo off the screen belt to the reserve pit. A spray bar is also provided to flush the screen openings free of any gumbo which may have lodged therein. The spray bar backflushes the screen openings using clean, high pressure drilling mud from which the gumbo has already been removed. The clean drilling mud may come from the clean mud stream exiting the gumbo separator or from a reservoir of cleaned mud at the drilling site if one is provided. The use of drilling mud for the spray eliminates the disadvantages of using water sprays, which dilute the drilling mud and change its viscosity properties, thus making it less effective.

Accordingly, the present invention removes the gumbo from the drilling mud before the gumbo can clog or blind the mud screening equipment, thereby preventing drilling shutdowns and reductions in drilling rate. The advantages of the invention are obtained at low cost, and without adversely affecting the properties of the drilling mud.

Important features of the present invention have been broadly summarized above in order that the following detailed description thereof may be better understood, and in order that the contribution to the art may be better appreciated. There are, of course, many additional features of the present invention that will be described in detail hereinafter and which will form the subject of tie claims appended hereto.

BRIEF DESCRIPTION OF THE DRAWINGS

The following is a brief description of the drawings of the present invention wherein like elements have been identified by like numerals.

FIG. 1A shows a cross sectional view taken through the side of a gumbo separator in accordance with the present invention;

DETAILED DESCRIPTION OF THE PREFERRED EMBODIMENTS

Although the present invention is described herein with respect to the particular application of separating hydrated clays, such as gumbo, from drilling mud, it will be recognized by one skilled in the art that other applications of the invention, such as in the mining and mineral and ore processing arts, are within the scope of the invention. The description that follows is intended to apply fully to any such applications and uses requiring the conveying or separation of liquid-solid mixtures or suspensions which behave as rheopectic fluids.

Figure 1B:
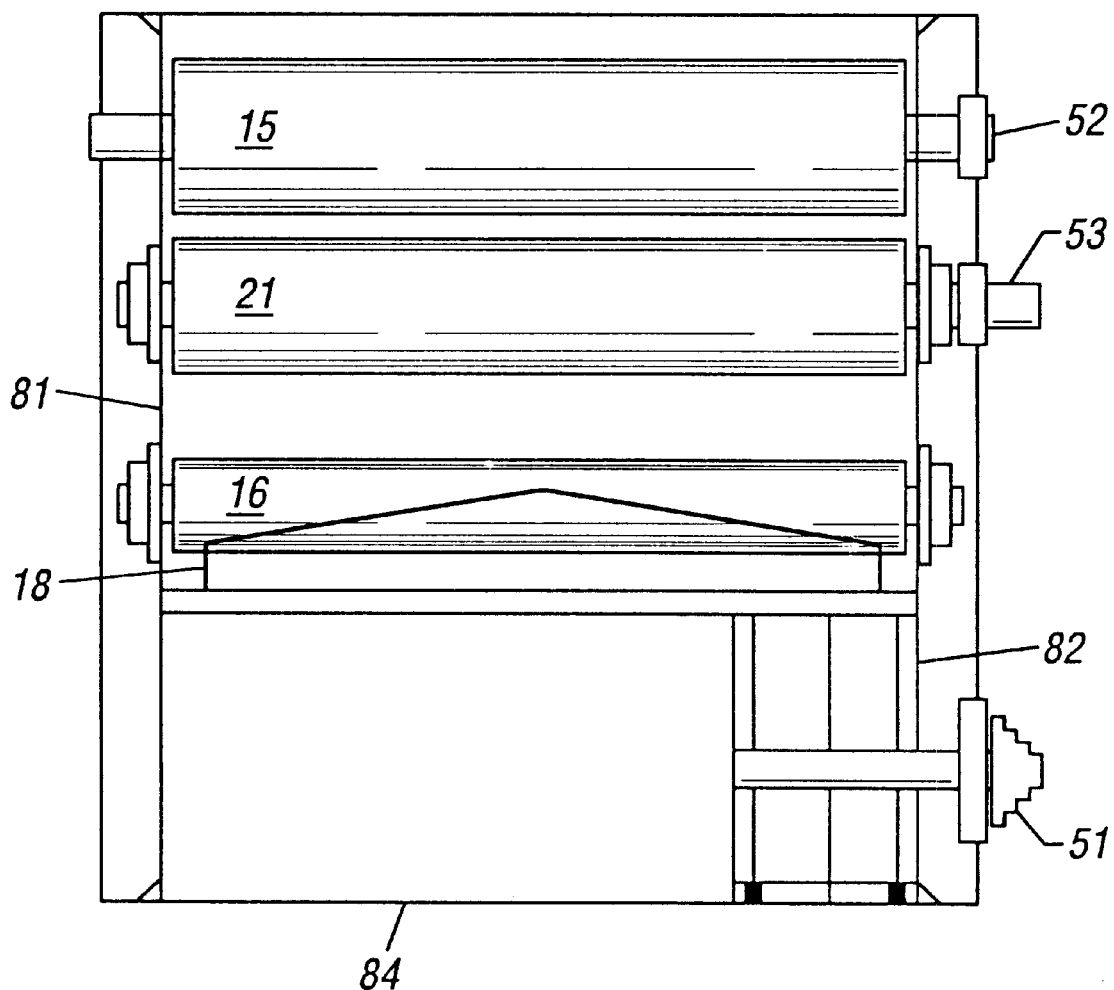
FIG. 1B shows a front end view of a gumbo separator in accordance with the present invention, showing selected components.
Figure 1C:
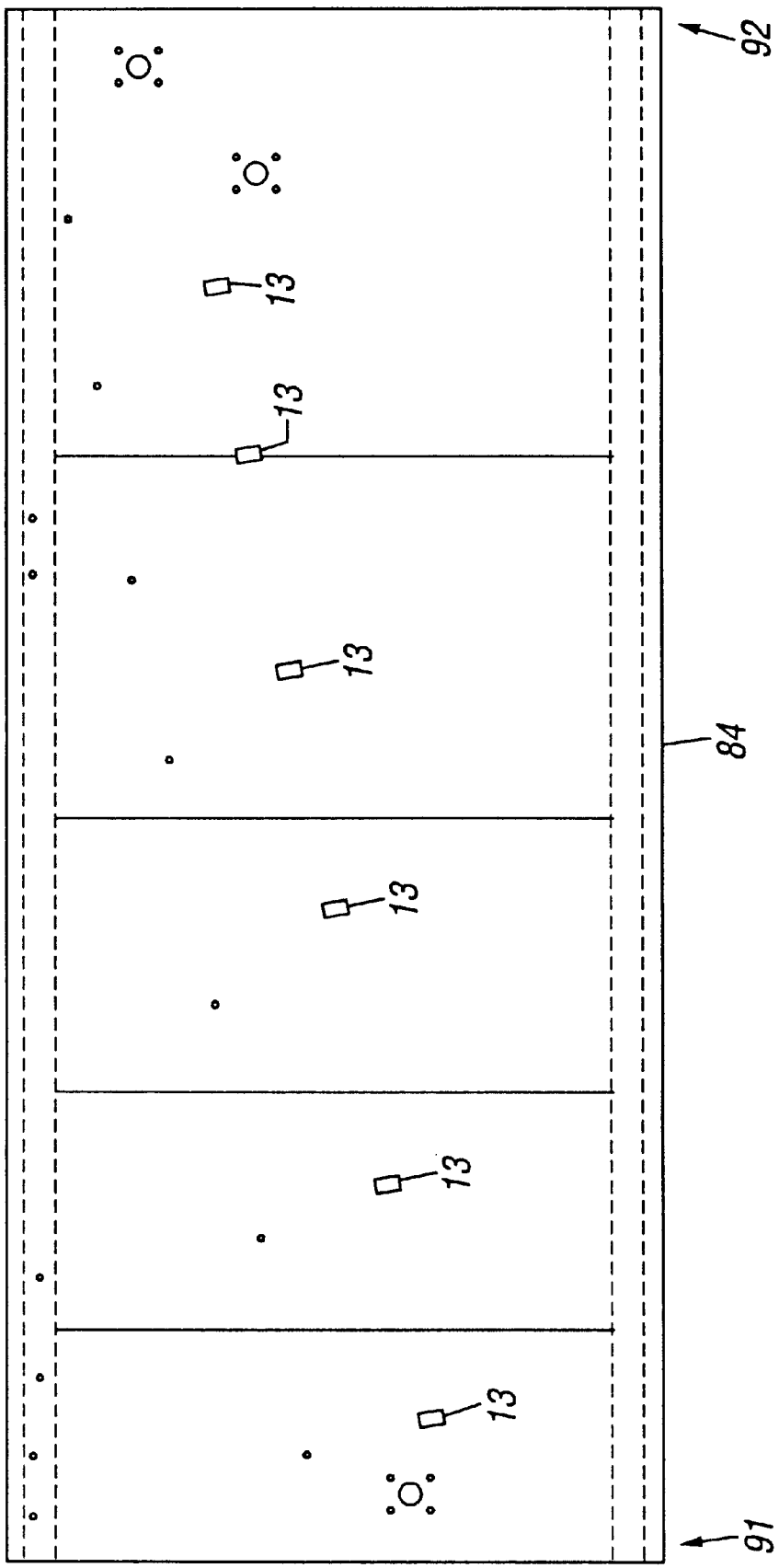
FIG. 1C shows a sideplate of a gumbo separator in accordance with the present invention, illustrating mounting holes and brackets.
Figure 1D:
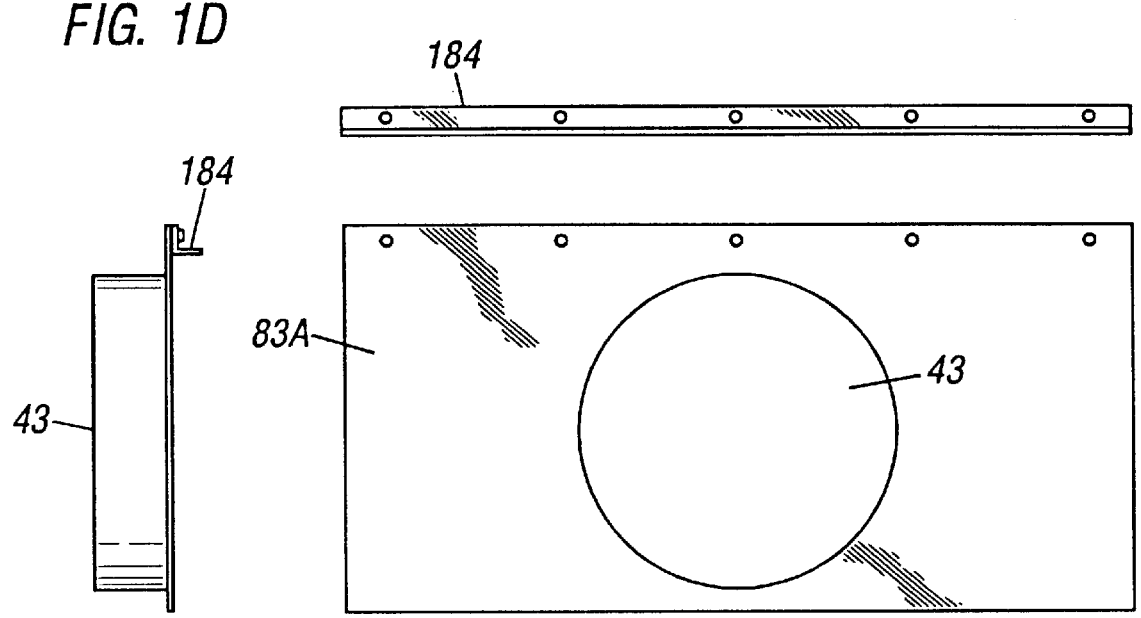
FIG. 1D shows front and side views of a bottom back plate and stiffener for use with a gumbo separator in accordance with the present invention.
Figure 1E:
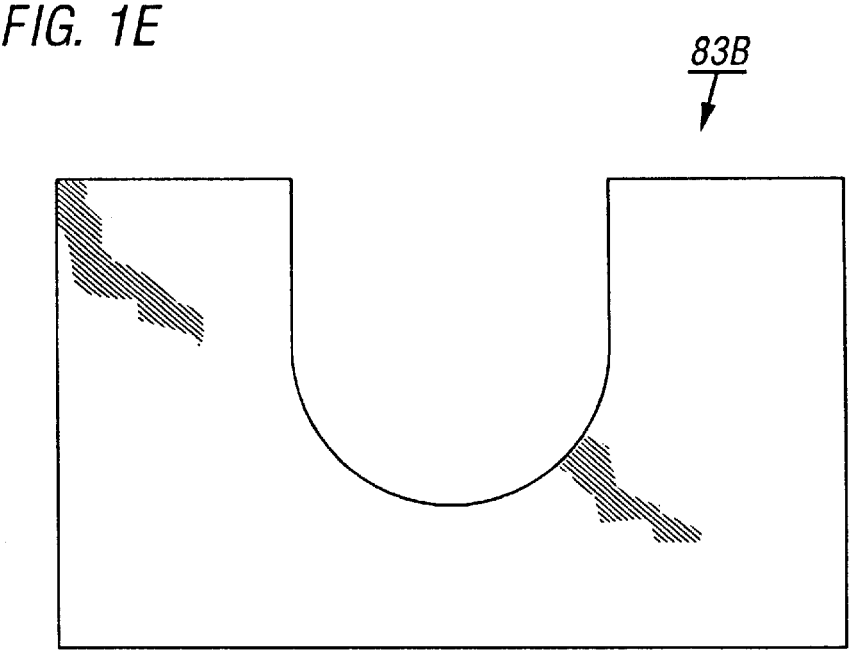
FIG. 1E shows a front view of a top back plate for use with a gumbo separator in accordance with the present invention.
Figure 1F:
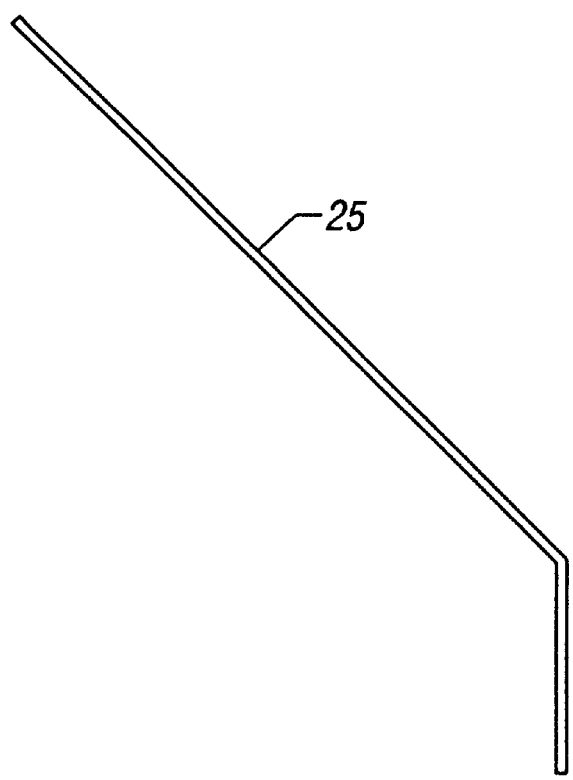
FIG. 1F shows a side view of a front hopper plate for use with a gumbo separator in accordance with tie present invention.
Figure 1G:
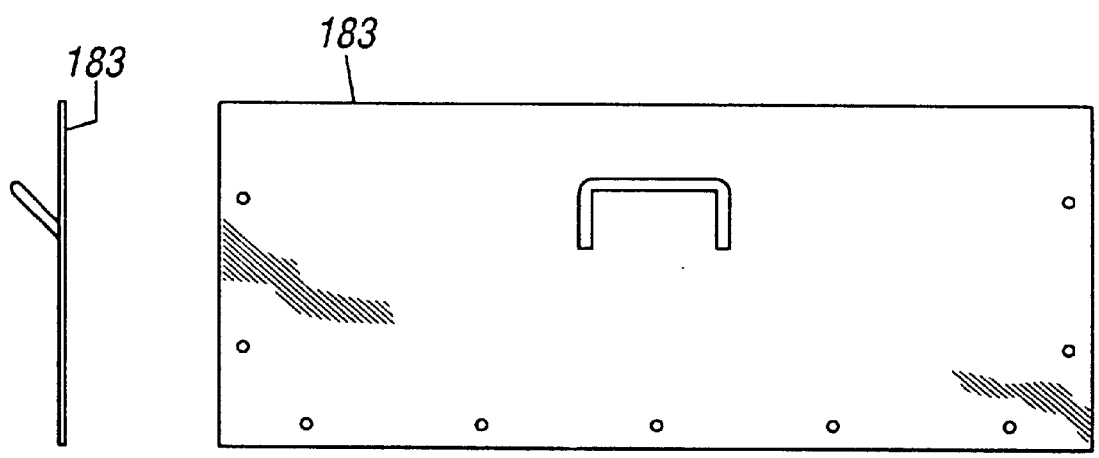
FIG. 1G shows front and side views of a back door for use with a gumbo separator in accordance with the present invention.

Referring now to FIGS. 1A–1H, there is shown an embodiment of a gumbo separator 10 according to the present invention. Gumbo separator 10 is preferably constructed as a square-framed vessel of horizontal plan with a first end 91 and a second end 92, and having a bottom back plate 83A (FIG. 1D) and a top back plate 83B (FIG. 1E) Located at the first end 91, side plates 81, 82, and an open base 84. A bottom back plate stiffener 184 is provided to strengthen bottom back plate 83A. First end 91 is also provided with a back door 183 for access to the interior of gumbo separator 10 (FIG. 1G).

A fluid inlet pipe 41 is preferably disposed at the first end 91 of gumbo separator 10 for passing an inlet fluid stream comprising drilling mud, drilling cuttings, and gumbo to a feeder 141. At the second end 92 of gumbo separator 10 a gumbo and cuttings outlet 42 is provided for passing the separated gumbo and oversize drilling cuttings from gumbo separator 10 to disposal. A drilling mud outlet 43 is provided in bottom back plate 83A for discharging the drilling mud and any unseparated drilling cuttings to downstream cleaning equipment such as shale shakers or other vibratory screening devices.

Gumbo separator 10 preferably includes a continuous screen belt 11. The screen belt 11 is preferably constructed of polyester, which exhibits excellent self-lubricating properties, but materials such as nylon, polyethylene, polypropylene, or other materials as are known in the art, may be used with satisfactory results. Screen belt 11 preferably has a mesh size of about 10, that is with roughly 10 openings per inch, but mesh sizes from about 5 to about 40 may be used without departing from the scope of the invention.

A particular screen belt 11 which has been used successfully in a gumbo separator 10 in accordance with the present invention is the "polyester 10 mesh" manufactured by TETKO, Inc. of Depew, N.Y. and constructed of polyester. The thickness of screen belt 11 is preferably about 0.1 inches and the width is preferably about 28 inches, although other dimensions may obviously be used without departing from the scope of the present invention. The ends of screen belt 11 are preferably connected to form a continuous loop by flexible lacing, as is known in the art.

Referring now to FIGS. 2A–2F, screen belt 11 preferably rides over, and is supported by, a perforated backing plate 12. Perforated backing plate 12 is preferably constructed of ultra high molecular weight ("UHMW") polyethylene but may also be constructed of other materials, like stainless steel, or aluminum, where corrosion is not a concern. The preferred combination of polyester for the screen belt 11 with UHMW polyethylene for the perforated backing plate 12 provides satisfactory slickness and wear resistance between screen belt 11 and perforated backing plate 12. The perforated backing plate 12 includes sidewalls 14 which are attached to the side plates 81 and 82, which assist in retaining the fluids from feeder 141 on the top surface of screen belt 11. Perforated backing plate 12 is supported by, and bolted to, a plurality of perforated backing plate support angles 9 which run transversely across and underneath perforated plate 12, as shown in FIGS. 2A–2D. Support angles 9 are firmly affixed to the sidewalls 14 of plate 12. The sidewalls 14 are mounted to side plates 81, 82 such that perforated backing plate 12 is inclined within gumbo separator 10 at an angle of about ten degrees from horizontal. Depending on the specific application and materials to be separated, the degree of incline may vary between about 0 degrees to about 20 degrees.

Figure 2A:
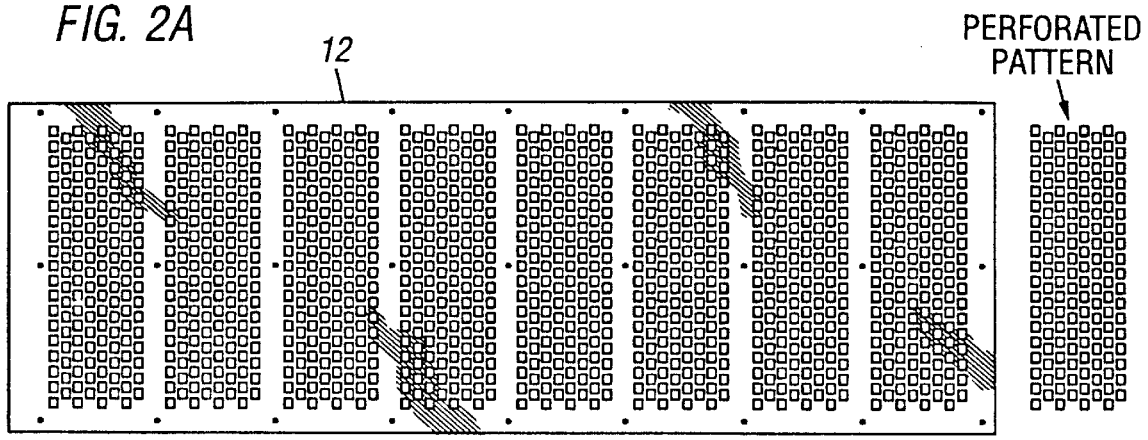
FIG. 2A shows top and side views of a perforated backing plate constructed for use in a gumbo separator in accordance with the present invention, and illustrates the pattern of perforations.
Figure 2B:
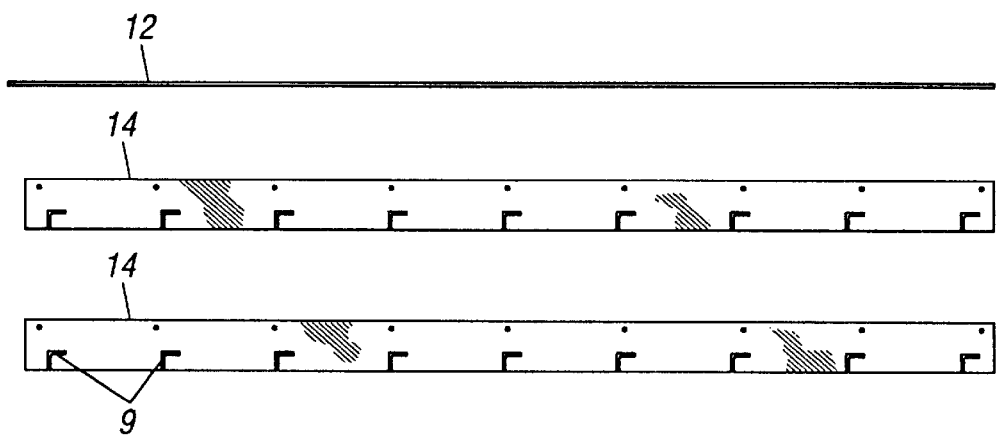
FIG. 2B shows side views of perforated backing plate side walls and support angles assembled for use in a gumbo separator in accordance with the present invention.
Figure 2C:
FIG. 2C shows top and side views of support angles for a perforated backing plate for use with a gumbo separator in accordance with the present invention.
Figure 2D:
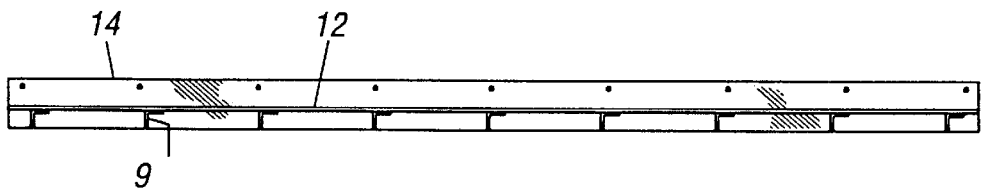
FIG. 2D shows a side view of a perforated backing plate, sidewalls, and support angles assembled for use with a gumbo separator in accordance with the present invention.

Perforations are preferably provided in perforated backing plate 12 to allow the drilling mud screened by screen belt 11 to fall through plate 12. Although many configurations of such perforations are possible, one configuration which has been used successfully in accordance with the present invention is illustrated in FIG. 2A. This configuration is designed to maximize the amount of open (perforated) area of the plate 12, while still providing satisfactory structural strength. Rows of such perforations are staggered in the direction of the belt movement as shown to make use of the entire belt surface. Accordingly, in a preferred embodiment approximately one-inch-square perforations are provided in eight groups, with a one and one-half-inch length spacing between groups under which support angles 9 pass. Each group of perforations comprises eight rows with alternating numbers of eighteen or nineteen roughly square perforations running the width of the perforated plate 12, and allowing a free (unperforated) space of about three and three eighths inches along each side of plate 12. Within each group of eight rows, a length spacing of approximately seven-sixteenths of an inch is allowed between perforations, and a width spacing of approximately three-eighths of an inch is allowed between perforations. As will be recognized by one skilled in the art, many other arrangements of perforations are possible without departing from the scope of the invention, provided only that the open area of the perforated plate 12 is sufficient for the desired capacity of the gumbo separator 10, and satisfactory support is provided for screen belt 11 and the fluids resting on it.

Referring again to FIGS. 1A and 1B, the screen belt 11 is also supported and held in tension by a drive roller 15, which drives and tensions screen belt 11, and an idler roller 16. Drive roller 15 is in turn driven by a drive assembly 17. Drive assembly 17 preferably comprises an electric motor 17A, a variable speed mechanical drive 17B, and a ninety degree gear reducer 17C, although one skilled in the art will recognize that other drive means may be used without departing from the scope of the invention. Drive assembly 17 drives drive roller 15 via a drive chain 61, running continuously between a motor sprocket 51 coupled to drive assembly 17 and a drive roller sprocket 52 coupled to drive roller 15, as is known in the art. Drive assembly 17 is preferably capable of moving screen belt 11 at a linear velocity of approximately 1440 inches per minute. Depending on the flow rate of the inlet fluid stream, the speed of screen belt 11 may vary from about 500 inches per minute and about 2880 inches per minute. A three-phase electric motor rated at one horsepower has been found to be satisfactory for operation of a gumbo separator in accordance with the present invention having a capacity of approximately 1100 gallons per minute of drilling mud.

Figure 1H:
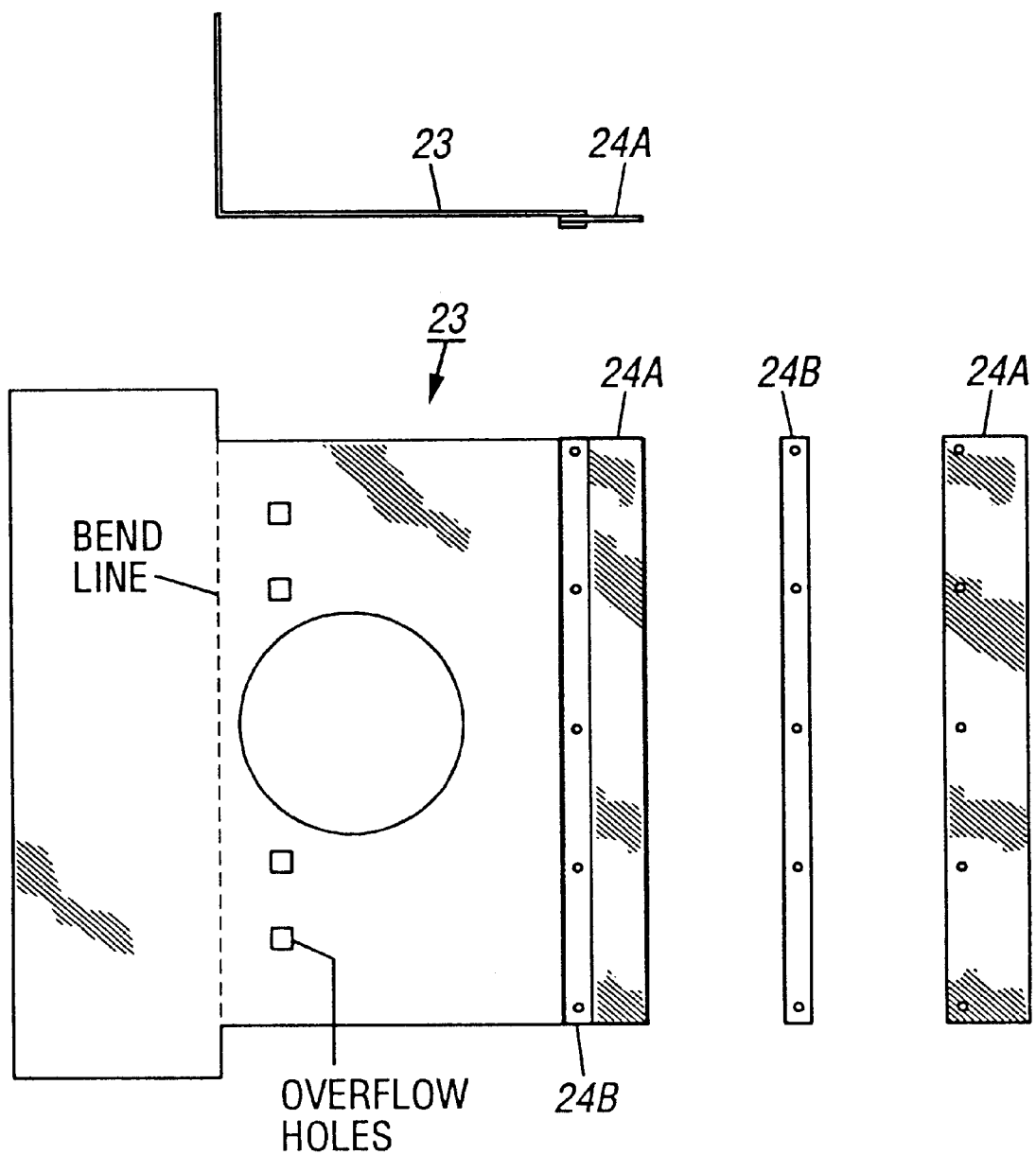
FIG. 1H shows front and side views of the of a puddle wall, puddle seal, and puddle seal mounting bracket assembled for use with a gumbo separator in accordance with the present invention.

Referring now to FIGS. 1A and 1H, a puddle wall 23 is disposed vertically along the width of perforating belt backing plate 12 near the idler roller 16 and horizontally back along the top of gumbo separator 10 to prevent any entering solids-laden fluid from splashing back to the drilling mud outlet 43 and avoiding separation. Puddle wall 23 is sealed to the screen belt by a rubber puddle seal 24A, to prevent fluid from flowing off the back of screen belt 11, and to assist formation of a puddle of fluid on screen belt 11. Puddle seal 24A is attached to the puddle wall 23 by puddle seal mounting bracket 24B, and screen belt 11 slides under puddle seal 24A to prevent fluids from flowing back down the screen belt 11. Puddle seal 24A may be constructed of any flexible rubber, such as nitride (buna-N), as is known in the art, so that a light seal is formed between puddle seal 24A and screen belt 11 that is substantially sufficient to prevent fluids from flowing back down screen belt 11 in operation.

Figure 2E:
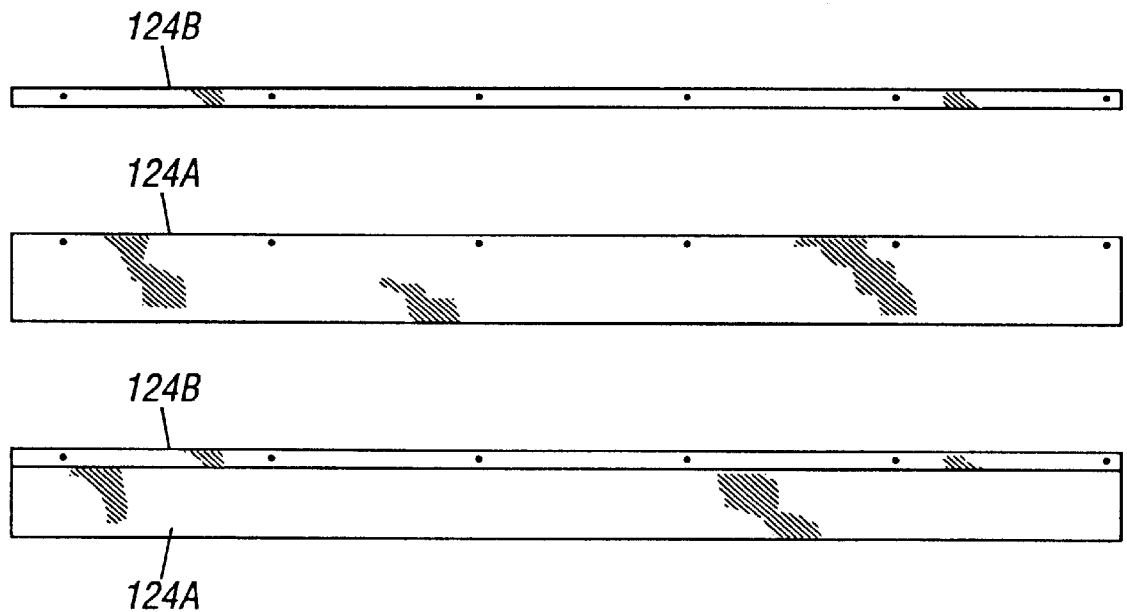
FIG. 2E shows side views of a side seal, a side seal mounting bracket, and such a seal and bracket assembled for use with a gumbo separator in accordance with the present invention.
Figure 2F:
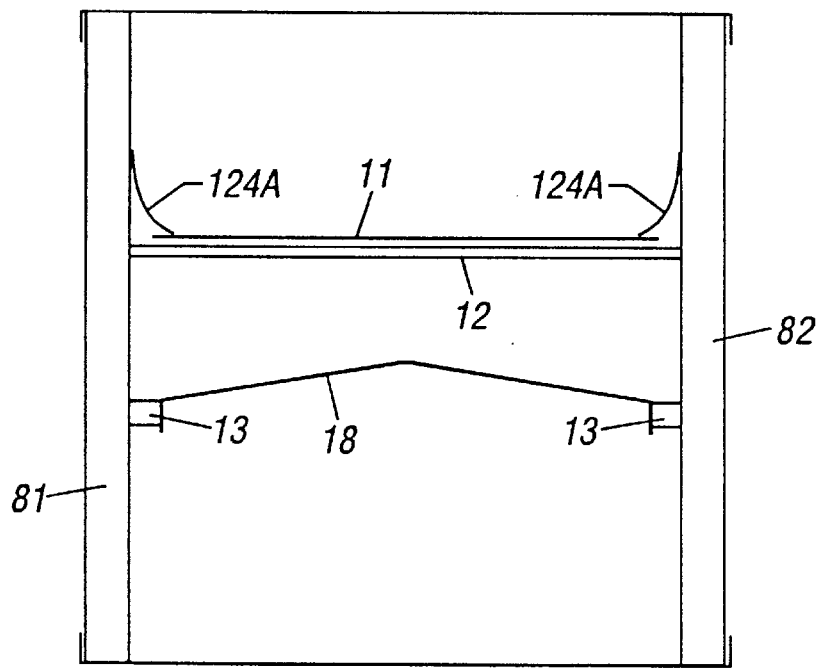
FIG. 2F shows a simplified front end view of a gumbo separator in accordance with the present invention, illustrating the interrelation of a screen belt, side seals, a perforated backing plate, and a deflector plate.

Referring now to FIGS. 2E and 2F, a side seal 124A is preferably attached to each of the side plates 81 and 82. The side seal 124A is made of flexible rubber and one edge of each of side seals 124A rides on top of the screen belt 11. This forms a light seal between side seal 124A and screen belt 11 and substantially prevents fluids and solids from moving off the edge of the screen belt 11. Side seals 124A are affixed to side plates 81, 82 by side seal mounting brackets 124B, which bolt to side plates 81, 82 along with perforated backing plate sidewalls 14, and preferably use the same bolt holes in side plates 81, 82, as shown in FIG. 1C.

Figure 3A:
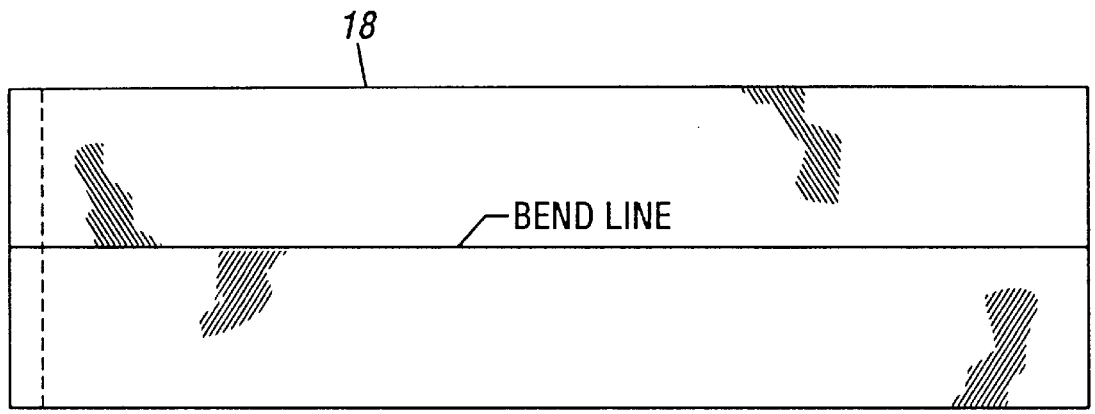
FIG. 3A shows a top view of a deflector plate constructed for use in a gumbo separator in accordance with the present invention.
Figure 3B:
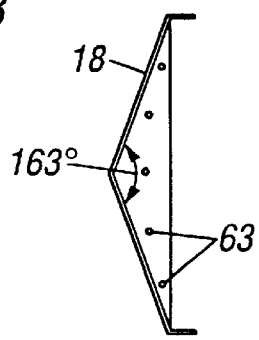
FIG. 3B shows an end view of a deflector plate and spray bar constructed for use in a gumbo separator in accordance with the present invention.
Figure 3C:
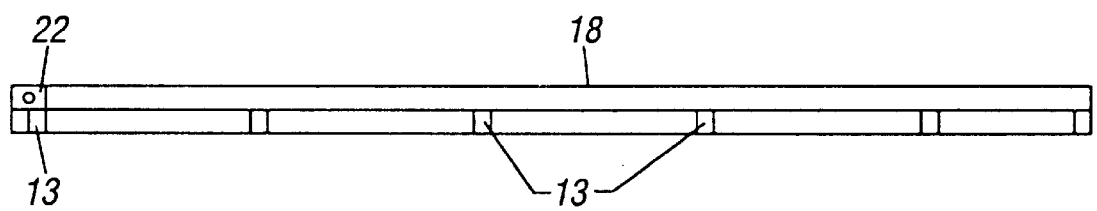
FIG. 3C shows a side view of a spray bar and deflector plate with mounting angles assembled for use in a gumbo separator in accordance with the present invention.
Figure 3D:
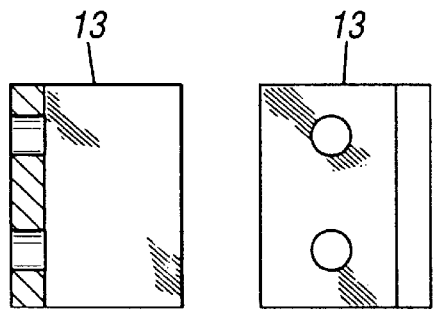
FIG. 3D shows top and end views of a deflector plate mounting angle constructed for use in a gumbo separator in accordance with the present invention.

Referring now to FIGS. 1A and 3A–3D, a deflector plate 18 is preferably disposed below the perforated backing plate 12 and along the length of perforated plate 12 from the idler roller at first end 91 of gumbo separator 10 to a front hopper plate 25, to prevent the separated drilling mud from collecting on the underside of screen belt 11. Deflector plate 18 preferably is peak-shaped as shown in FIG. 3B, and may be formed from a sheet of steel or other material by bending the sheet at its centerline and along its length to form an angle of approximately 163 degrees. The angle of the bend in deflector plate 18 is not critical and may be any angle providing only that fluids will flow freely down its sides. Deflector plate 18 is mounted within the gumbo separator 10 using a plurality of deflector plate mounting angles 13, shown in FIGS. 3C and 3D. Deflector plate mounting angles 13 are attached to deflector plate 18 and to the side plates 81, 82 of gumbo separator 10 (as illustrated in FIG. 1C), thus maintaining deflector plate 18 firmly in place.

Referring now to FIGS. 1A and 1F, the front hopper plate 25 preferably extends from just below the front end of deflector plate 18 down to the second end 42, and then vertically down to the base 84 of gumbo separator 10, at a sufficiently steep angle that any gumbo falling to front hopper plate 25 will continue to slide out of the gumbo separator 10 through the gumbo and cuttings outlet 42. The front surface of front hopper plate 25 preferably comprises a sheet of UHMW polyethylene or a similarly slippery material over which gumbo slides freely and which may be bolted to front hopper plate 25. Rear hopper plate 19 extends from the front hopper plate 25 back to the base 84 of gumbo separator 10 at the first end 91 of gumbo separator 10. Rear hopper plate 19 is inclined at an angle sufficient to permit drilling mud falling on it to flow freely along it and out of the gumbo separator 10 through the drilling mud outlet 43. The front hopper plate 25 and the rear hopper plate 19 are sealed, for example by welding, to each other and to the side plates 81, 82 of gumbo separator 10 such that the space thus created under the hopper plates 25, 19 remains relatively dry and free of fluid. The variable speed drive assembly 17 is preferably disposed beneath the hopper plates 25, 19.

Referring now to FIGS. 1A and 1B, a belt cleaning brush 21 for cleaning the screen belt 11 is preferably disposed adjacent to second end near the gumbo and cuttings outlet 42, and below the drive roller 15, to brush any gumbo particles retained on the surface of screen belt 11 into the gumbo and cuttings outlet 42. Belt cleaning brush 21 preferably is a roughly cylindrical brush, with relatively stiff bristles which brush the surface of screen belt 11 in operation. The bristles may comprise a metallic wire, or suitably stiff plastic, such as nylon, or natural fibers. Alternatively, belt cleaning brush 21 may be generally cylindrical with either longitudinal or spiral paddles protruding from its surface. Belt cleaning brush 21 is preferably driven by drive assembly 17 via drive chain 61, running continuously between motor sprocket 51 coupled to drive assembly 17 and a brush sprocket 53 coupled to belt cleaning brush 21, as is known in the art. Drive assembly 17 thus preferably drives both belt cleaning brush 21 and drive roller 15 via drive chain 61. Belt cleaning brush 21 preferably rotates in a direction opposite to the direction of motion of screen belt 11. The diameters of the respective sprockets 52, 53 and rollers 15, 21 are preferably selected so that the velocity of the bristles of belt cleaning brush 21 where they meet the underside of screen belt 11 is approximately twice the velocity of screen belt 11. For example, where the outside diameter of belt cleaning brush 21 is approximately equal to that of drive roller 15, sprockets 52, 53 are preferably sized so that belt cleaning brush 21 rotates at about twice the rate of drive roller 15.

Referring now to FIGS. 1A and 3B, a spray bar 22 is preferably disposed just above the underside of screen belt 11 but below the peak of deflector plate 18, and extends along the width of the screen belt 11, to remove any gumbo particles that have lodged in the apertures of screen belt 11. Spray bar 22 preferably comprises a sealed manifold within deflector plate 18, having a plurality of spray nozzles 63 aimed to spray down at the underside of screen belt 11. One end of spray bar 22 is connected to one end of a spray bar supply hose 32, which supplies spray bar 22 with drilling mud under a pressure of about 40 pounds per square inch. The spray bar supply hose 32 is connected at its other end to the outlet of pump 31. Pump 31 is preferably an air-driven diaphragm pump but may be any type of positive displacement pump capable of providing sufficient fluid pressure to spray bar 22. Drilling mud is preferably supplied to pump 31, which is preferably disposed externally to gumbo separator 10, by a pump inlet 33, which may be placed in any source of relatively clean drilling mud. Alternatively, pump inlet 33 may be placed within the gumbo separator 10 near the mud outlet 43, if a reservoir of drilling mud above rear hopper plate 19 can be maintained at a high enough level to cover pump inlet 33.

Figure 4:
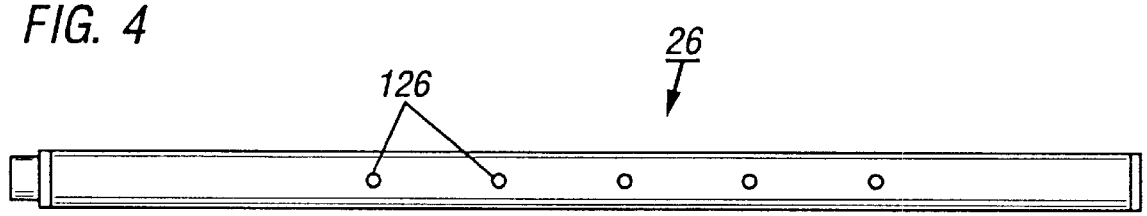
FIG. 4 shows a bottom view of a mist spray bar constructed for use in a gumbo separator in accordance with the present invention.
Figure 5:
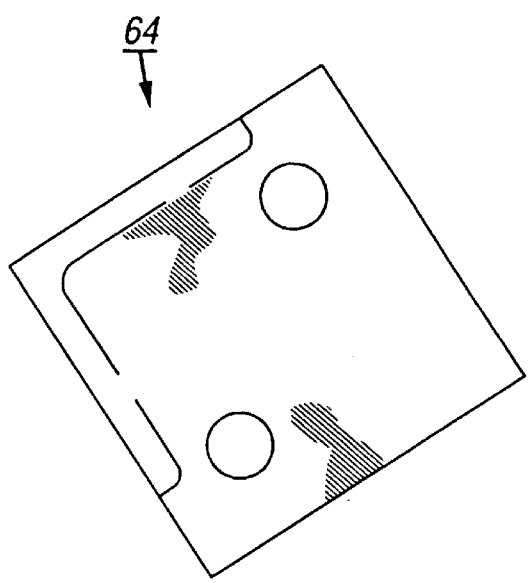
FIG. 5 shows a side view of a scraper for use with a gumbo separator in accordance with the present invention.

Referring to FIGS. 1A, 4, and 5, an optional water mist bar 26 may be disposed above the upper surface of screen belt 11 and nearer to rear hopper plate 19 than front hopper plate 25, for spraying drilling mud off of any gumbo retained to this point on the screen belt 11. Water mist bar 26 is connected to a source of water (not shown) and uses a very fine water mist sprayed through orifices 126, that adds only a minimal amount of water to the separated drilling mud. A scraper 64, illustrated in FIG. 5, may also be provided below drive roller 15 and ahead of belt cleaning brush 21, just above the surface of, but without touching, screen belt 11. Scraper 64 dislodges any large gumbo clumps from screen belt 11 into the gumbo and cuttings outlet 42 or onto front hopper plate 25 as the screen belt 11 moves around drive roller 15.

Figure 6:
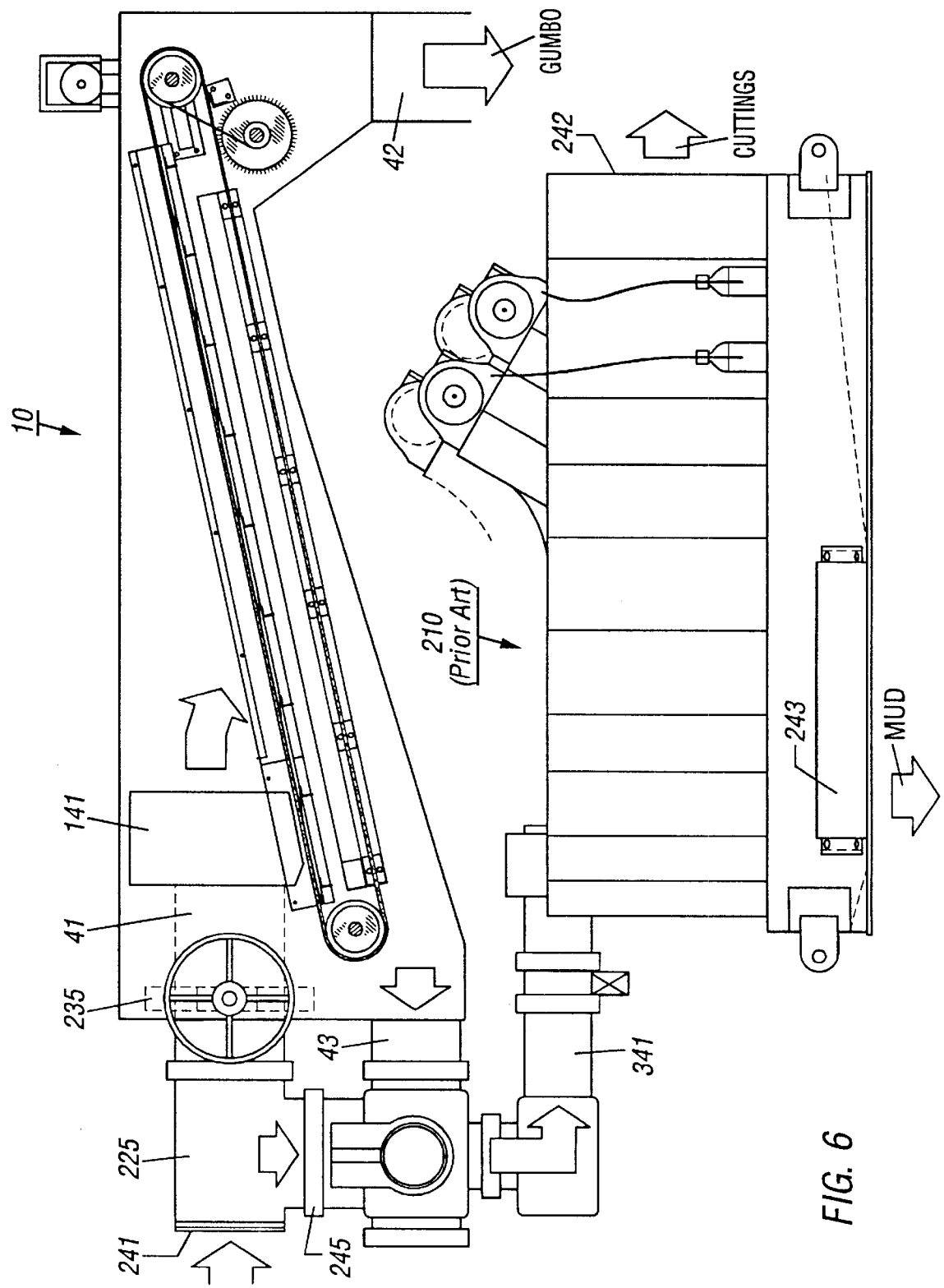
FIG. 6 shows a side view of a gumbo separator in association with downstream mud cleaning equipment in accordance with the present invention.

Referring now to FIG. 6, a gumbo separator 10 in accordance with the present invention is illustrated in association with a prior art Derrick® Flo-Line™ Cleaner 210. A feed inlet 241 is provided to a pipe tee 225, which connects to the inlet pipe 41 and feeder 141 of gumbo separator 10. A gumbo separator inlet valve 235 and a bypass valve 245 are provided to control the flow path of the inlet fluids. The mud outlet 243 connects to an inlet manifold 341 which feeds fluid to the Flo-Line™ Cleaner 210. The mud outlet 243 and solids outlet 242 of Flo-Line™ Cleaner 210 provide for the discharge of cleaned mud for recirculation and drilling cuttings for disposal, respectively.

The operation of a gumbo separator in accordance with the present invention can be described as follows, with reference to FIGS. 1A and 6. When no gumbo is being encountered in drilling operations, the gumbo separator 10 is bypassed by opening bypass valve 245 and closing inlet valve 235. The solids-laden drilling mud then passes from feed inlet 241 through pipe tee 225 to inlet manifold 341 and then to the Flo-Line™ Cleaner 210 or conventional separation equipment such as a vibrating screening machine. The fluids are then cleaned in the conventional manner, and the gumbo separator 10 imposes no additional burden on the drilling operations. Cleaned mud exits via outlet 243 and drilling cuttings exit via outlet 242.

When drilling operations encounter a formation containing problematic levels of gumbo, the variable speed drive assembly 17 is engaged at a speed which is appropriate for gumbo content of the entering fluids. Inlet valve 235 is opened and bypass valve 245 is closed. The drilling mud to be cleaned then enters the gumbo separator 10 through inlet pipe 41 and feeder 141, along with drilling cuttings and the gumbo which must be removed. Drive assembly 17 drives the drive roller 15, which has been previously tensioned as is known in the art, through the sprocket and chain arrangement described above, which causes the screen belt 11 to move smoothly in a generally clockwise direction with reference to FIG. 1A. Generally a screen belt speed of 1440 inches will be sufficient, although higher and lower speeds are of course possible without departing from the scope of the invention. Screen belt 11 rides on, and is supported by, perforated backing plate 12.

The entering fluids fall from feeder 141 to the upper surface of screen belt 11. The liquid and very fine particles of the drilling mud pass through the openings of the screen belt 11. The liquid and fine particles also pass through the perforations in perforated backing plate 12, are diverted from the underside of screen belt 11 by deflector plate 18, and flow down rear hopper plate 19 to the drilling mud outlet 43. Some cuttings, namely those that are small enough to pass through the openings in screen belt 11, will be carried along with the drilling mud through mud outlet 43. These are subsequently removed from the drilling mud in downstream solids separation equipment such as Flo-Line™ Cleaner 210.

Some of the fluids remain for a period of time as a puddle on the top surface of screen belt 11 in the vicinity of the idler roller 16, and are retained there by puddle wall 23, puddle seal 24A, side seals 124A and side plates 81, 82. This puddle adds to the pressure on the drilling mud close to the apertures in screen belt 11 by creating a hydrostatic head of fluid above it, and thus assists in forcing the mud through the screen belt 11.

The gumbo is conveyed up the inclined screen belt 11 towards drive roller 15 at second end 92 of gumbo separator 10. The gumbo conveys successfully because only minimal energy is added to the inlet fluids during conveying and in effecting the separation, thus distinguishing the present invention from previous attempts to separate materials which behave as rheopectic fluids by vibratory screening, and other methods which add energy to the fluid by vibrating, shaking, or the like, thus producing undesirable gumbo patties with their concomitant operations problems. The gumbo separator 10 of the present invention is thus a great advance in the art because to date no reliable method of removing gumbo has been put forward which possesses the qualities of adding no chemicals, while removing all configurations of gumbo at low cost.

Any drilling mud which collects on the gumbo may be washed off by the fine spray from water mist bar 26 and flows as described above to drilling mud outlet 43. Water mist bar 26 thus conserves drilling mud, minimizing the consumption of this expensive material. Water mist bar 26 may also be operated to reduce the viscosity of the drilling mud, should it increase due to the concentration of gumbo in the mud. In actual practice, the amount of water added by water mist bar 26 is kept to the minimum amount necessary to conserve the mud while maintaining its viscosity.

As the screen belt 11 passes around drive roller 15, most of the gumbo along with the cuttings (if any) that are retained on the screen belt 11 exits the gumbo separator 10 through the gumbo and cuttings outlet 42. Any large clumps of gumbo which are retained are peeled off screen belt 11 as they pass scraper 64. Any small particles which remain on the screen belt 11 are then brushed off by the counter-rotating belt cleaning brush 21. Gumbo and cuttings which find their way to the front hopper plate 25 will slide down the plate into outlet 42. Front hopper plate 25 extends up close enough to the underside of screen belt 11 that gumbo is prevented from moving back towards the direction of the drilling mud outlet 43.

Any gumbo which has lodged in the openings of screen belt 11 is removed by the high pressure spray bar 22, which sprays drilling mud under high pressure at and through screen belt 11. Because spray bar 22 sprays drilling mud via pump 31, the properties of the expensive and complicated drilling mud are not degraded as they would be if a water spray were used. The now-cleaned screen belt 11 then travels around idler roller 16 and returns to the area below the fluids inlet 41 through which inlet fluids continuously pass to gumbo separator 10.

The mud and any entrained cuttings flow from mud outlet 43 through manifold 341 into the Flo-Line™ Cleaner 210 or to conventional mud cleaning equipment, which removes the cuttings from the drilling mud. The cuttings exit from Flo-Line™ solids outlet 242, while the cleaned mud exits via Flo-Line™ clean mud outlet 243.

When drilling operations have passed through the gumbo-containing formations, the drive assembly 17 may be disengaged, bypass valve 245 opened, inlet valve 235 closed, and the drilling mud and cuttings will simply bypass the gumbo separator 10 as before. Typically, depending on the geographic location of the well site, the gumbo separator 10 will be in operation during approximately 30 per cent of the overall drilling process.

The gumbo separator apparatus and methods of the present invention have thus been described above with respect to applications involving the separation of hydrated clays from drilling mud. However, one skilled in the art will recognize that many other applications are possible without departing from the scope of the invention. For example, many applications of the invention may be found in the mining and mineral and ore processing arts, where separation processes may be complicated by the rheopectic nature of one or more of the process streams or process stream components. Such applications of the apparatus and methods of the present invention are specifically contemplated hereby as being within the scope of the above description of the present invention.

The foregoing descriptions are directed to particular embodiments of the invention for the purpose of illustration and explanation. It will be apparent, however, to one skilled in the art that many modifications and changes to the embodiments set forth above are possible without departing from the scope and the spirit of the invention. It is intended that the following claims be interpreted to embrace all such changes and modifications.

I claim:

1. Apparatus for separating solids from a liquid-solid suspension according to particle size, comprising:
   a moving screen belt, having an inlet end for receiving the liquid-solid suspension and solids, said screen belt having a plurality of apertures through which a substantial portion of the liquid-solid suspension passes;
   a puddle wall for retaining a puddle of the liquid-solid suspension near said inlet end, said puddle creating a head of fluid in contact with said screen belt sufficient to assist in forcing said substantial portion of the liquid-solid suspension through said plurality of apertures;
   said screen belt conveying the solids which do not pass through said apertures from the inlet end to a discharge end.

2. The apparatus of claim 1, further comprising:
a rotating belt cleaning brush disposed near the discharge end for removing solids on the screen belt to a solids outlet.

3. The apparatus of claim 2, further comprising:
a mud outlet, said mud outlet discharging a portion of the liquid-solid suspension that passes through said apertures;
a nozzle for spraying a portion of the liquid-solid suspension through the apertures of the screen belt to remove solids lodged therein, the output of said nozzle being discharged from said mud outlet and not being discharged from said discharge end.

4. The apparatus of claim 3, further comprising:
a perforated backing plate on which a portion of the screen belt is slidably supported, said perforated backing plate having a plurality of perforations for passing the solid-liquid suspension.

5. The apparatus of claim 4, further comprising:
a scraper for removing large deposits of solids from the screen belt to the solids outlet.

6. The apparatus of claim 5, further comprising:
a water mist spray for washing liquid-solid suspension from the solids on the screen belt.

7. The apparatus of claim 6, wherein a surface of the perforated backing plate is substantially comprised of ultra high molecular weight polyethylene.

8. The apparatus of claim 7, wherein the screen belt has approximately ten apertures per inch.

9. The apparatus of claim 6, wherein the screen belt has from five to forty apertures per inch.

10. A gumbo separator for separating gumbo from drilling fluids, comprising:
a fluids inlet, for passing the gumbo and drilling fluids into the gumbo separator;
a gumbo outlet, for discharging the gumbo from the gumbo separator;
a drilling fluids outlet, for discharging the drilling fluids from the gumbo separator;
an inclined, moving screen belt having a plurality of apertures, for receiving the gumbo and drilling fluids from the fluids inlet;
a spray disposed substantially below a portion of the screen belt that receives the inlet drilling fluids and gumbo, for spraying gumbo out of the screen belt apertures, said spray comprising drilling fluids substantially free of gumbo, wherein said gumbo from the screen belt apertures is discharged from said drilling fluids outlet;
a perforated backing plate disposed beneath a portion of the screen belt and upon which the screen belt slides freely, said perforated backing plate having a plurality of perforations.

11. The gumbo separator of claim 10, further comprising:
a belt cleaning brush for brushing gumbo from the screen to the gumbo outlet, said belt cleaning brush moving in a direction substantially opposite to that of the screen belt at the point where the belt cleaning brush brushes gumbo from the screen belt.

12. A gumbo separator for separating gumbo from drilling fluids, comprising:
a fluids inlet, for passing the gumbo and drilling fluids into the gumbo separator;
a gumbo outlet, for discharging the gumbo from the gumbo separator;
a drilling fluids outlet, for discharging the drilling fluids from the gumbo separator;
an inclined, moving screen belt having a plurality of apertures, for receiving the gumbo and drilling fluids from the fluids inlet;
a spray disposed substantially below a portion of the screen belt that receives the inlet drilling fluids and gumbo, for spraying gumbo out of the screen belt apertures, said spray comprising drilling fluids substantially free of gumbo, wherein said gumbo from the screen belt apertures is discharged from said drilling fluids outlet,
a perforated backing plate disposed beneath a portion of the screen belt and upon which the screen belt slides freely, said perforated backing plate having a plurality of perforations;
a belt cleaning brush for brushing gumbo from the screen to the gumbo outlet, said belt cleaning brush moving in a direction substantially opposite to that of the screen belt at the point where the belt cleaning brush brushes gumbo from the screen belt; and
a puddle wall and a puddle seal for retaining a puddle of drilling fluids on a portion of the screen belt, said puddle creating a head of fluid in contact with said screen belt sufficient to assist in forcing the drilling fluids through said plurality of apertures.

13. The gumbo separator of claim 12, further comprising:
a gumbo scraper disposed near the gumbo outlet, for removing large clumps of gumbo from the screen belt to the gumbo outlet.

14. The gumbo separator of claim 11, further comprising:
a plate disposed substantially below the belt cleaning brush to prevent gumbo removed from the screen belt from passing to the drilling fluids outlet, said plate being inclined toward the gumbo outlet at an angle sufficient for the gumbo to slide freely down the plate to the gumbo outlet.

15. The gumbo separator of claim 14, wherein the surface of the plate contacted by the gumbo is substantially comprised of ultra high molecular weight polyethylene.

16. The gumbo separator of claim 15, further comprising:
a water mist disposed above the screen belt, for washing drilling fluids retained on gumbo conveying up the screen belt through the screen belt to the drilling fluids outlet.

17. Apparatus for separating solids from a solution containing fluid and solids, comprising:
a vessel having a solution inlet and a fluid outlet;
a solids discharge outlet in said vessel for discharging solids removed from the solution;
an inclined belt within said vessel having a top surface for transporting solids from a first end adjacent to said solution inlet to a second end adjacent to said solids discharge outlet, said belt formed of a nonmetallic material and having a plurality of apertures formed therethrough;
a motor and drive mechanism for rotating said belt;
a perforated backing plate disposed beneath at least a portion of said belt and upon which said belt slides during rotation;
a puddle wall in said vessel adjacent to and beneath said solution inlet for retaining a head of the solution containing the solids on said first end of said inclined belt, said head sufficient to assist in forcing the solution through said plurality of apertures.

18. The apparatus of claim 17, wherein the belt substantially comprises polyester.

19. The apparatus of claim 17, wherein the belt mesh size is between about 5 mesh and about 40 mesh.

20. The apparatus of claim 18, wherein the apertures in the belt are between about 0.015 inches and 0.16 inches in diameter.

21. The apparatus of claim 17, where the belt is inclined at about ten degrees from horizontal.

22. The apparatus of claim 17, wherein the speed of the belt is about 1440 inches per minute.

23. The apparatus of claim 19, wherein the perforations in the backing plate are about one inch square.

24. The apparatus of claim 23, further comprising:

a brush disposed between the second end of the belt and the solids discharge outlet.

25. The apparatus of claim 24, further comprising:

a nozzle spraying fluid through apertures of the belt, said nozzle positioned so that said sprayed fluid exits said fluid outlet.

26. A method for separating a solid-liquid suspension fluid from an inlet suspension containing a solid which forms a rheopectic fluid in suspension, comprising the steps of:

forming a puddle of inlet suspension fluid at a low end of a continuous, inclined, screen belt having a plurality of screening apertures, to create a hydrostatic head over the screening apertures beneath the puddle, said hydrostatic head being sufficient to assist at least a portion of the solid-liquid suspension fluid through said plurality of screening apertures;

moving the screen belt with energy sufficient only to convey the solid from the low end to a high end of the screen belt without allowing the solid to clog the screening apertures;

passing the solid-liquid suspension fluid through the screening apertures;

passing the screen belt around a roller such that a substantial portion of the solid falls from the screen belt under the influences of gravity and its own inertia.

27. The method of claim 26, further comprising the step of:

brushing solids from the screen belt with a belt cleaning brush moving in a direction substantially opposite that of the screen belt.

28. The method of claim 27, further comprising the step of:

spraying a portion of the solid-liquid suspension fluid at and through the screen belt apertures to remove solids lodged within the apertures, said solids removed from the apertures being discharged proximate to said low end.

29. The method of claim 28, further comprising the step of:

spraying the solids conveying up the screen belt with a fine mist of water that is just sufficient to wash off solid-liquid suspension fluid retained on the solids.

30. The method of claim 29, wherein the solids substantially comprise hydrated clays and the solid-liquid suspension fluids substantially comprise drilling mud.

* * * * *